United States Patent
Holten

(10) Patent No.: US 8,292,473 B2
(45) Date of Patent: Oct. 23, 2012

(54) LIGHT-EMITTING PANEL HAVING CAVITIES FOR COUPLING OUT LIGHT

(75) Inventor: Petrus Adrianus Josephus Holten, Aalten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 480 days.

(21) Appl. No.: 12/521,901

(22) PCT Filed: Jan. 4, 2008

(86) PCT No.: PCT/IB2008/050019
§ 371 (c)(1),
(2), (4) Date: Dec. 23, 2009

(87) PCT Pub. No.: WO2008/084420
PCT Pub. Date: Jul. 17, 2008

(65) Prior Publication Data
US 2010/0091480 A1    Apr. 15, 2010

(30) Foreign Application Priority Data
Jan. 12, 2007 (EP) .................................... 07100480

(51) Int. Cl.
*F21V 5/00* (2006.01)
(52) U.S. Cl. ........ 362/330; 362/607; 362/615; 362/628; 362/616; 362/331
(58) Field of Classification Search ............... 362/607, 362/615, 616, 628, 629, 330, 331, 332, 237
See application file for complete search history.

(56) References Cited

U.S. PATENT DOCUMENTS

| | | | |
|---|---|---|---|
| 6,092,904 | A | 7/2000 | Tai et al. |
| 6,199,989 | B1 | 3/2001 | Maeda et al. |
| 6,379,016 | B1 | 4/2002 | Boyd et al. |
| 6,742,907 | B2 | 6/2004 | Funamoto et al. |
| 6,980,728 | B2 * | 12/2005 | Ladstatter et al. ............ 385/146 |
| 2002/0060907 | A1 * | 5/2002 | Saccomanno ................ 362/31 |
| 2005/0073229 | A1 | 4/2005 | Wimbert et al. |
| 2005/0140849 | A1 | 6/2005 | Hoelen et al. |
| 2005/0157518 | A1 | 7/2005 | Kazuhiro et al. |

FOREIGN PATENT DOCUMENTS

| | | |
|---|---|---|
| JP | 2001110222 A | 4/2001 |
| WO | 2005031412 A1 | 4/2005 |
| WO | 2005073622 A1 | 8/2005 |

\* cited by examiner

*Primary Examiner* — Stephen F Husar
*Assistant Examiner* — James Cranson, Jr.
(74) *Attorney, Agent, or Firm* — Mark L. Beloborodov

(57) ABSTRACT

A light-emitting panel comprising a plate-like translucent member (1) having a light-emitting front side (3) and, parallel thereto, a rear side (4) which has a plurality of cavities (2). Light can be coupled out by specular reflection from surfaces (8) of the cavities (2). Each cavity (2) has a side wall (7) and a bottom (8), which extends at an angle to said rear side (4). Each cavity (2) comprises a filler element (10) which is in optical contact with a major portion of the side wall (7) of the cavity (2), while there is a distance between the filler element (10) and the bottom (8) of the cavity (2) in order to form a closed space (11).

12 Claims, 4 Drawing Sheets

LIGHT-EMITTING PANEL HAVING CAVITIES FOR COUPLING OUT LIGHT

FIELD OF THE INVENTION

The invention relates to a light-emitting panel having at least one light-entrance edge for coupling light from a light source into the light-emitting panel, the light-emitting panel comprising a plate-like translucent member having a light-emitting front side and, parallel thereto, a rear side which has a plurality of cavities via which light can be coupled out by specular reflection from surfaces of the cavities. The plate-like member is preferably transparent, but is at least translucent.

BACKGROUND OF THE INVENTION

Such light-emitting panels can be used, inter alia, as backlight panels in liquid crystal display (LCD) devices, for example, TV sets, monitors, displays of computers, (portable) telephones, etc. Such light-emitting panels can also be used as luminaires for several lighting purposes, for example, shop lighting, with which objects can be seen through the panel illuminating the objects behind it. Furthermore, such light-emitting panels can be used on walls or ceilings of spaces or rooms which are evenly illuminated by means of these panels. The light source of the panel can be detachably connected to the light-entrance edge of the panel or may be an integral part of this edge.

A light-emitting panel of the type described above is disclosed in WO-A-2005/073622. This publication describes a rectangular transparent light-emitting panel having a front side and a rear side, in which cavities are present. These cavities are straight slits between the front side and the rear side, which slits are inclined with respect to the plane of the panel. One edge of the panel is provided with an array of light-emitting diodes (LEDs) in such a manner that the light radiation of the diodes is coupled into the panel. The light radiation which has been coupled in leaves the light-emitting panel by specular reflection against the side surfaces of the slits. By appropriate distribution of the inclined slits throughout the panel, the light is coupled out evenly through the entire front side of the panel.

Appropriate light-guiding materials for parts of the panel are transparent thermoplastics, in particular polymethyl methacrylate (PMMA), polycarbonate (PC), or polyvinyl butyral (PVB). Such materials can be shaped in an injection-molding process, an extrusion process, or a material-removing laser operation.

Due to the presence of cavities in the form of inclined slits, the light-emitting panel cannot have an uninterrupted front surface. Furthermore, it is a drawback that the cavities are in contact with the environment, so that their walls can be contaminated.

OBJECT AND SUMMARY OF THE INVENTION

It is an object of the invention to provide a light-emitting panel comprising a plate-like translucent member having cavities, via which light can be coupled out through the front side of the light-emitting panel by specular reflection from surfaces of the cavities, and in which the plate-like member has an uninterrupted front surface.

It is another object of the invention to provide a light-emitting panel comprising a plate-like translucent member having cavities, via which light can be coupled out through the front side of the light-emitting panel by specular reflection from surfaces of the cavities, in which each cavity is a closed space.

It is a further object of the invention to provide a light-emitting panel comprising a plate-like translucent member having cavities, via which light can be coupled out through the front side of the light-emitting panel by specular reflection from surfaces of the cavities, which may be curved in any desired direction.

In order to achieve one or more of these objects, each cavity has a side wall and a bottom, in which the bottom extends at an angle to said rear side, while each cavity comprises a filler element which is in contact with a major portion of the side wall of the cavity, and in which there is a distance between the filler element and the bottom of the cavity. The space inside the cavity is thereby closed, because it is surrounded by the bottom of the cavity, a small portion of the side wall, and a portion of the surface of said filler element.

The material of the plate-like member and the material of the filler elements are preferably both transparent, with the filler elements making optical contact with the side wall of the cavities, so that disturbance of the light radiation coupled into the panel is minimal.

In a preferred embodiment, the side wall of the cavity is substantially perpendicular to the rear side of the plate-like member, i.e. the angle between the surface of said side wall and the rear side of the plate-like member is 90° or, preferably, the surface of the side wall of the cavity tapers from the rear side into the material of the plate-like member. In a preferred embodiment, said angle is between 80° and 90°, more preferably between 85° and 89°. The filler element has a corresponding shape and can easily be shifted into the cavity up to the location where it has the desired small distance to the bottom of the cavity.

The sectional shape of the cavity, parallel to said rear side, may be rectangular or square, but in a preferred embodiment, the sectional shape is substantially circular, so that the surface of the side wall of the cavity has a conical shape that tapers from said rear side into the material of the plate-like member. The axis of the cone is preferably substantially perpendicular to said rear side, so that the apex angle of the cone is smaller than 20°, preferably between 2° and 10°. The filler element having a corresponding shape can be shifted into the cavity up to its predetermined location at a small distance from the bottom of the cavity. The filler element is firmly pressed against the side wall of the cavity, so that appropriate optical contact is obtained between the filler element and the side wall of the cavity. Because of the tapered shape of the filler element, optical contact between the surface of the filler element and the side wall of the cavity can be obtained without the need of glue or any other intermediate substance, but, if appropriate, they may of course be used to ensure optical contact.

The bottom of the cavity may have a curved shape, preferably a concave shape, so that the light radiation which has been coupled out is distributed conveniently in the space in front of the light-emitting panel. The cavity may have a spherical bottom.

In a preferred embodiment, the distance between the filler element and the bottom of the cavity in the central area of said bottom is larger than said distance near the side wall of the cavity. Almost the entire side wall of the cavity can then be in optical contact with the filler element, resulting in a minimal disturbance of propagation of light radiation coupled into the light-emitting panel. In said central area, contact between the filler element and the bottom of the cavity is avoided because of the relatively large distance in between.

In a preferred embodiment, the filler element facing the bottom of the cavity has a flat surface, so that it may have a simple shape, while, in combination with the curved shape of the bottom of the cavity, the space between the filler element and said bottom has an appropriate shape.

The bottoms of the cavities preferably extend at an angle between 10° and 60°, more preferably between 25° and 50°, to the rear side of the plate-like member, which bottoms form the surfaces for specular reflection in order to couple out the light through the front side of the panel.

In a preferred embodiment, a plate-like support member is present, while a plurality of said filler elements is attached to this support member which is located at the rear side of the plate-like member. The support member may be relatively thin and abut the rear side of the plate-like member, so that there can be optical contact between the plate-like member and the support member. The light radiation which has been coupled in is thus guided by both the plate-like member and the material of the support member. In another embodiment, there is some distance between the support member and the rear side of the plate-like member, so that the light radiation which has been coupled in is substantially guided by the plate-like member.

The support member and the filler elements carried by the support member can be produced as one part, for example, by means of an injection-molding process or hot embossing operation. When assembling the light-emitting panel, the support member carrying a plurality of filler elements has to be placed on the rear side of the plate-like member, with the filler elements being inserted into the cavities. The predetermined position of each filler element in its corresponding cavity is automatically achieved when the support member abuts the rear side of the plate-like member. Moreover, the presence of several filler elements on the same support member facilitates assembly of the panel. Furthermore, the support member provides a smooth rear side of the light-emitting panel.

A plurality of plate-like support members is preferably present at the rear side of the plate-like member, while edges of the support members are located near each other. The support members are preferably rectangular. Relatively small, rectangular support members can easily be handled during assembly of the light-emitting panel.

In a preferred embodiment, the material of the filler elements is more flexible than the material of the plate-like member. The plate-like member may have a small flexibility in order to reduce the flexibility of the light-emitting panel. A more flexible material of the filler elements facilitates optical contact between the surface of the material of the filler elements and the side wall of the cavities.

The cavities may have different dimensions, such as different cross-sectional diameters, and different depths, as well as different angles of the inclined bottoms, etc. Also the mutual distances between the cavities may vary. The light can thus be coupled out through the front side of the panel in an evenly distributed manner or in a manner varying across the surface of the front side of the panel, so that certain areas of the front side emit more light than other areas.

BRIEF DESCRIPTION OF THE DRAWINGS

The invention will now be further elucidated with reference to the drawings in which.

DESCRIPTION OF EMBODIMENTS

Figure 1:
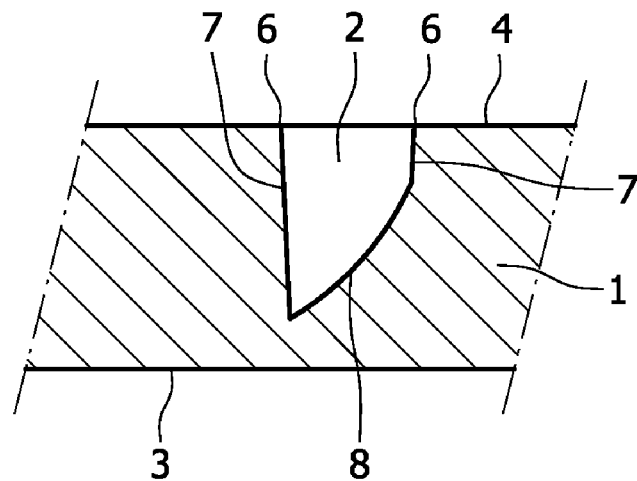
FIG. 1 is a sectional view of a portion of the plate-like member.

FIG. 1 is a sectional view of a portion of the transparent plate-like member 1 comprising a cavity 2. The plate-like member has a front side 3 with a flat uninterrupted surface. Parallel to the front side 3 is a rear side 4. The rear side 4 is interrupted by the cavity 2 having a circular edge 6. The cavity 2 has a conical side wall 7 and a bottom 8, which is inclined with respect to the rear side 4 and is curved.

Figure 2:
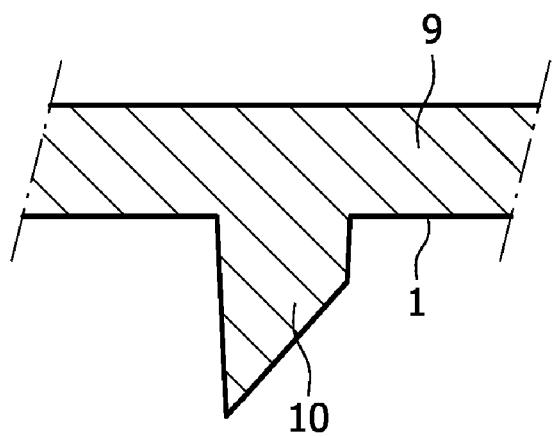
FIG. 2 is a sectional view of a portion of the support member with a filler element.
Figure 3:
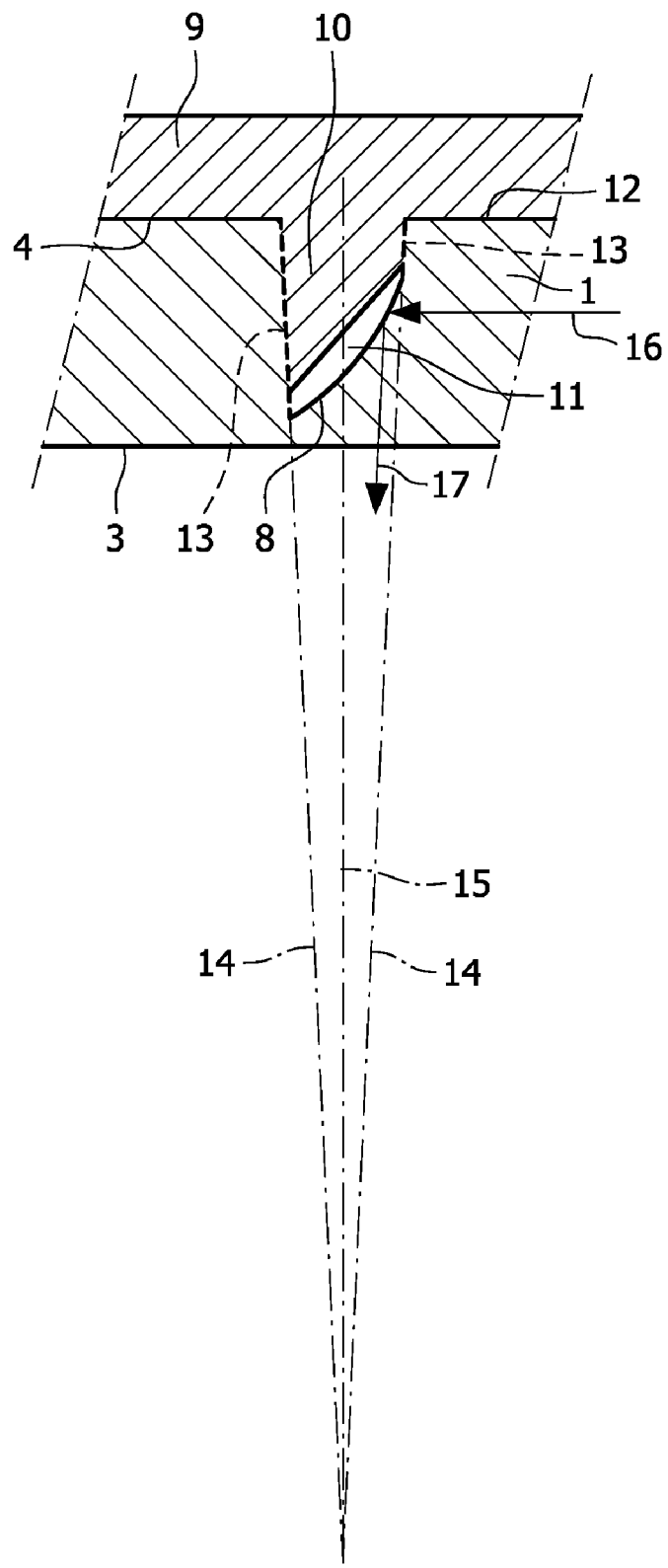
FIG. 3 is a sectional view of a portion of the assembled light-emitting panel.

FIG. 2 is a sectional view of a portion of the plate-like support member 9 carrying a filler element 10. The shape of the filler element 10 corresponds to the shape of the cavity 2. However, the filler element 10 has a flat lower surface (in FIG. 2) and a smaller dimension in the vertical direction (in both Figures) than the corresponding dimension of the cavity 2, so that the bottom 8 of the cavity 2 is not touched by the filler element 10 when it is shifted into the cavity 2, as is shown in FIG. 3. There is a closed disk-like space 11 between the bottom 8 and the filler element 10, so that the height of the space 11 in the central area is larger than the height near the circumference of the disk-like space 11.

FIG. 3 is a sectional view of a portion of the light-emitting panel, in which the transparent plate-like member 1 and the support member 9 are placed upon each other, so that the lower side 12 of the support member 9 abuts the rear side 4 of the plate-like member 1. The conical side wall 7 of the cavity 2 abuts the corresponding surface of the filler element 10, and the contact surface is indicated by the broken lines 13 in FIG. 3. The contact surface (broken lines 13) extends on the surface of a cone, which cone is indicated by the dot-and-dash lines 14, while the axis of the cone is indicated by the dot-and-dash line 15.

The bottom 8 of the cavity 2, being the lower wall of the closed space 11, is a surface from which light radiation (arrow 16) coming from an edge of the plate-like member 1 (in the Figures at the right) is reflected (arrow 17) through the front side 3 of the plate-like member 1.

In this embodiment of the invention, the apex angle of the cone (angle between lines 14) is 10°, and the axis (line 15) of the cone is perpendicular to the rear side 4 of the plate-like member 1. The dimension of the filler element 10 with respect to the side wall 7 of the cavity provides a firm contact between the two surfaces (broken line 13), so that they make optical contact. The lower side 12 of the support member 9 may abut the rear side 4 of the plate-like member 1 or may have some distance from this side 4. The rear side 4 may be a surface that reflects the light radiation which has been coupled in. However, in another embodiment, the lower side 12 of the support member 9 makes optical contact with the rear side 4 of the plate-like member 1, so that the light radiation which has been coupled in is guided by both the plate-like member 1 and the support member 9.

Figure 4:
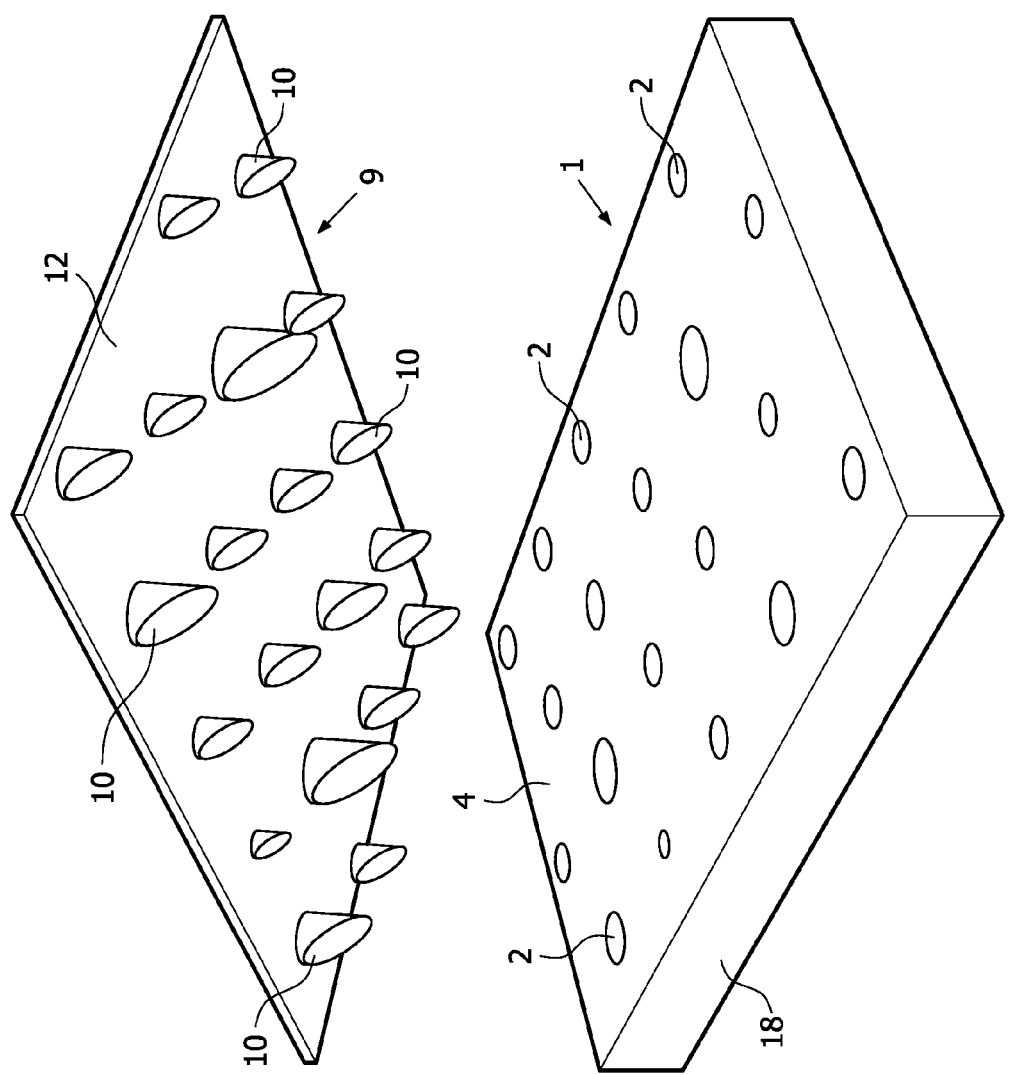
FIG. 4 is a perspective view of the first embodiment.

FIG. 4 is a perspective view of the first embodiment of the transparent plate-like member 1 and the support member 9 prior to assembly of the two members 1, 9. The rear side 4 of the plate-like member 1 has cavities 2 and the lower side 12 of the support member 9 carries filler elements 10. When the two members 1, 9 are joined, each filler element 10 fits in a corresponding cavity 2, while a closed space will remain between the inclined lower side of the filler element 10 and the inclined bottom of the corresponding cavity 2, as is shown in FIG. 3. Light can be coupled into the plate-like member through light-entrance edge 18 and will be coupled out through the front side (lower side) of the plate-like member 1 by specular reflection from the inclined bottoms 8 of the cavities 2 (not represented in FIG. 4, but shown in FIG. 3).

Figure 5:
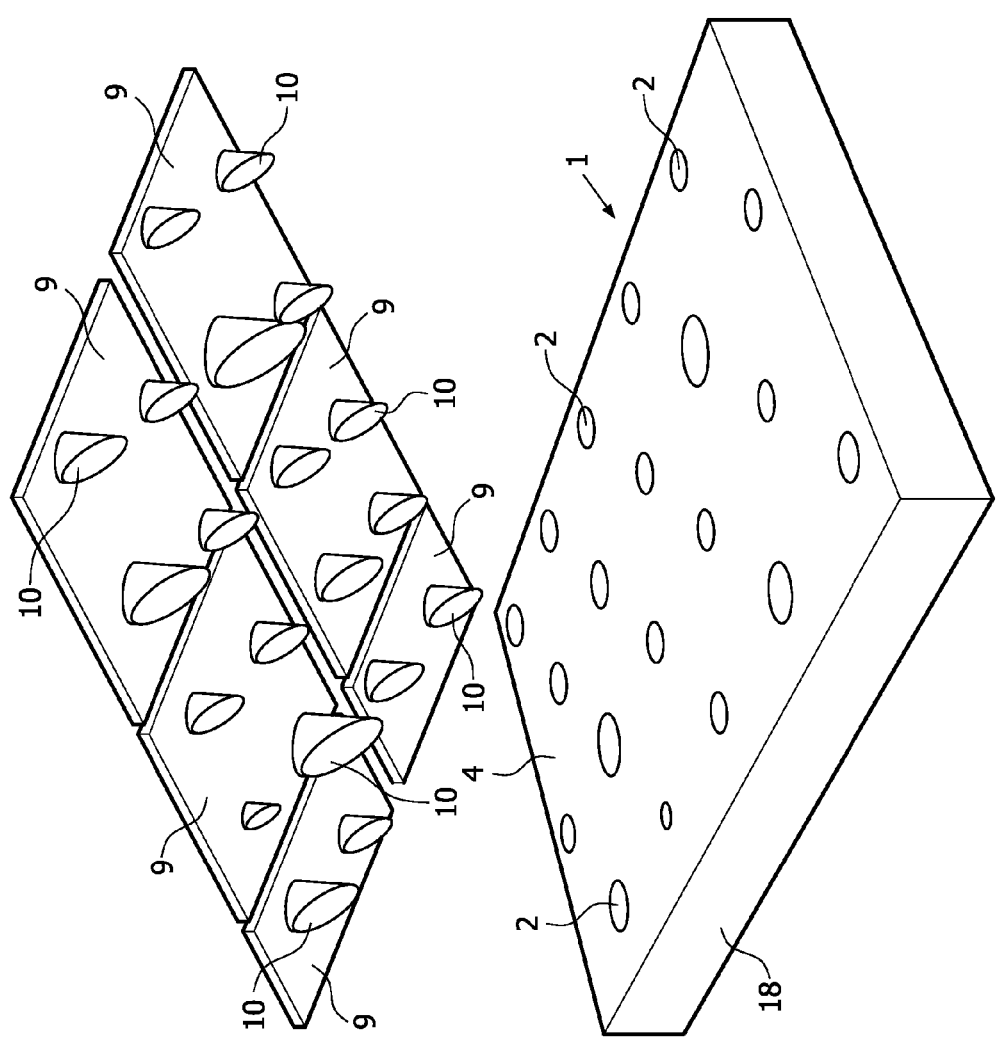
FIG. 5 is a perspective view of the second embodiment.

FIG. 5 is a perspective view of the second embodiment of the light-emitting panel comprising a transparent plate-like member 1 and a plurality of support members 9, each carrying a plurality of filler elements 10. The presence of a plurality of smaller support members 9 instead of one larger support member 9 (FIG. 4) facilitates assembly of the light-emitting panel, and production of the smaller support members 9 is less complicated.

The two embodiments of the light-emitting panel according to the invention as described above are only examples; many other embodiments are possible.

List of Reference Numerals
1 transparent plate-like member
2 cavities in member 1
3 front side of member 1
4 rear side of member 1
6 circular edge of cavity 2
7 conical side wall of cavity 2
8 curved bottom of cavity 2
9 plate-like support member
10 filler elements carried by support member 9
11 space between bottom 8 and filler element 10
12 lower side of support member 9
13 two broken lines indicating contact between side wall 7 and filler element 10
14 two dot-and-dash lines indicating the cone
15 dot-and-dash line indicating the axis of cone 14
16 arrow indicating light which has been coupled in
17 arrow indicating light coupled out through front side 3
18 edge of plate-like member 1

The invention claimed is:

1. A light-emitting panel having at least one light-entrance edge for coupling light from a light source into the light-emitting panel, the light-emitting panel comprising a plate-like translucent member having a light-emitting front side and, parallel thereto, a rear side defining a plurality of cavities for outcoupling light by specular reflection from surfaces of the cavities, wherein each cavity comprises a side wall filler element in contact with a major portion of the side wall of the cavity, and a bottom extending at an angle to said rear side, such that there is a distance between the filler element and the bottom of the cavity, wherein the surface of the side wall of the cavity has a conical shape which tapers from said rear side into the material of the plate-like member, while the axis of the cone is perpendicular to said rear side, and the apex angle of the cone is smaller than 20°.

2. A light-emitting panel is claimed in claim 1, wherein the side wall of the cavity is perpendicular to the rear side of the plate-like member.

3. A light-emitting panel is claimed in claim 1, wherein the surface of the side wall of the cavity tapers from the rear side into the material of the plate-like member.

4. A light-emitting panel as claimed in claim 1, wherein the bottom of the cavity has a concave shape.

5. A light-emitting panel as claimed in claim 1, wherein the distance between the filler element and the bottom of the cavity in the central area of said bottom is larger than said distance near the side wall of the cavity.

6. A light-emitting panel as claimed in claim 1, wherein the filler element facing the bottom of the cavity has a flat surface.

7. A light-emitting panel as claimed in claim 6, wherein a plurality of plate-like support members is present at the rear side of the plate-like member, while edges of the support members are located near each other.

8. A light-emitting panel as claimed in claim 1, wherein the bottoms of the cavities extend at an angle between 10° and 60°, to the rear side of the plate-like member.

9. A light-emitting panel as claimed in claim 1, further comprising a plate-like support member located at the rear side of the plate-like member, wherein a plurality of said filler elements is attached to said support member.

10. A light-emitting panel as claimed in claim 1, wherein the material of the filler elements is more flexible than the material of the plate-like member.

11. A light-emitting panel having at least one light-entrance edge for coupling light from a light source into the light-emitting panel, the light-emitting panel comprising a plate-like translucent member having a light-emitting front side and, parallel thereto, a rear side defining a plurality of cavities for outcoupling light by specular reflection from surfaces of the cavities, wherein each cavity comprises a side wall filler element in contact with a major portion of the side wall of the cavity, and a bottom extending at an angle to said rear side, such that there is a distance between the filler element and the bottom of the cavity, wherein the distance between the filler element and the bottom of the cavity in the central area of said bottom is larger than said distance near the side wall of the cavity 12. A light-emitting panel having at least one light-entrance edge for coupling light from a light source into the light-emitting panel, the light-emitting panel comprising:
a plate-like translucent member having a light-emitting front side and, parallel thereto, a rear side defining a plurality of cavities for outcoupling light by specular reflection from surfaces of the cavities, wherein each cavity comprises a side wall filler element in contact with a major portion of the side wall of the cavity, and a bottom extending at an angle to said rear side, such that there is a distance between the filler element and the bottom of the cavity; and
a plate-like support member located at the rear side of the plate-like member, wherein a plurality of said filler elements is attached to said support member.

* * * * *